United States Patent

Montenare

[11] 3,975,042
[45] Aug. 17, 1976

[54] PNEUMATIC CYCLE BUMPER

[76] Inventor: Anthony Montenare, 326 N. 4th St., Reading, Pa. 19601

[22] Filed: Sept. 5, 1974

[21] Appl. No.: 503,443

[52] U.S. Cl. ................................. 293/61; 267/82; 267/116; 267/139; 293/71 P; 293/85
[51] Int. Cl.² ................ B60R 19/10; B60R 21/14; F16F 9/04; F16F 9/34
[58] Field of Search ................ 267/82, 116, 139; 293/60, 61, 71 P, 71, 85

[56] References Cited
UNITED STATES PATENTS

| | | | |
|---|---|---|---|
| 1,397,685 | 11/1921 | Hargood | 267/82 |
| 2,574,739 | 11/1951 | Harley | 293/61 |
| 3,203,723 | 8/1965 | Montenare | 293/60 |
| 3,473,836 | 10/1969 | Halter | 293/60 |
| 3,741,598 | 6/1973 | Novak et al. | 293/71 P |

*Primary Examiner*—Robert J. Spar
*Assistant Examiner*—Howard Beltran
*Attorney, Agent, or Firm*—Mason, Mason & Albright

[57] ABSTRACT

A pneumatic bumper for a cycle has an inner chamber that is enclosed by collapsible sides. An enveloping cover pneumatically encases the inner chamber and the chamber is vented to allow air to escape in a controlled manner when the sides collapse and the front and back of the bumper are moved towards one another upon impact. The bumper can be secured to the front upright parts of a bicycle and/or motorcycle frame so that the bumper extends, at least in part, ahead of the front wheel of the cycle. The front of the bumper can be provided with an ornamental design or fanciful part to enhance the overall appearance of the bumper.

7 Claims, 5 Drawing Figures

PNEUMATIC CYCLE BUMPER

Recent traffic safety considerations have resulted in the development of many automobile safety devices to mitigate impact damage upon collisions. Few of these recently developed devices are designed to protect cycle riders or pedestrians involved in cycle accidents.

The present invention is concerned with reducing impact damage and/or injuries that occur when bicycles and/or motorcycles are involved in collision accidents.

Figure 1:
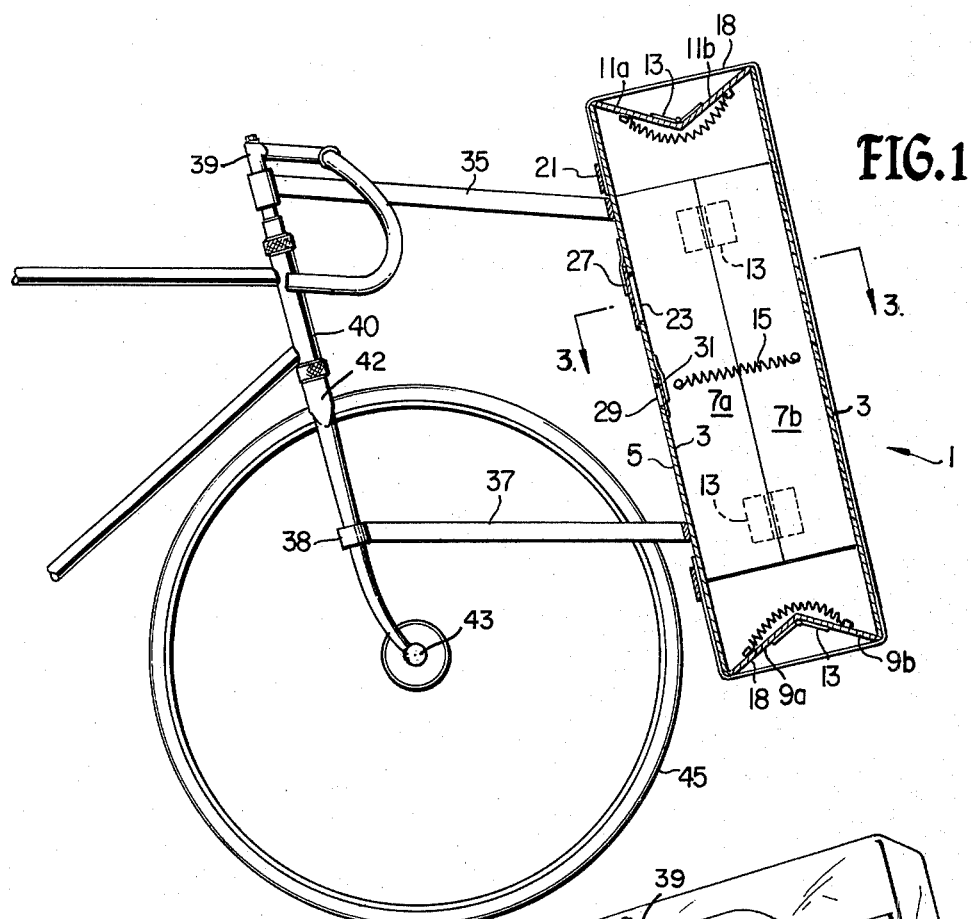
FIG. 1 is a side elevation of a mounted bumper.

In FIG. 1, the bumper 1 has a front 3 and a back 5 which are interconnected with one another by collapsible sides 7, bottom 9 and top 11. The sides 7 as well as bottom 9 and top 11 are comprised of two rigid sections that have hinges 13. The hinges 13 all are pivotable about axes that extend along the joins of the sections of sides 7, bottom 9 and top 11. The front 3 and back 5 can be moved towards and away from one another by collapsing the sections 7a, 9a and 11a about their hinge connections much in the manner of an accordian.

The sides 7 can be identical to one another and the top 11 and bottom 9 are essentially the same as one another. Each side 7, as well as top 11 and bottom 9, can be formed of more than two articulated sections with each hinge being associated with means to bias the sections apart or flat.

Figure 3:
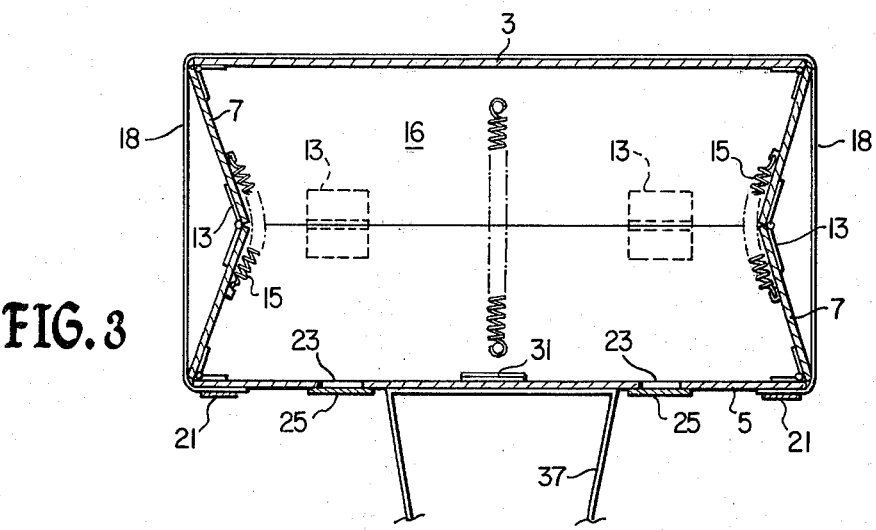
FIG. 3 is a section of the FIG. 1 bumper taken along the lines 3 — 3.

As seen in FIG. 3, each section of side 7 is biased about its hinge 13 by one or more tension springs 15 so that the sides 7 are straightened to a degree and an enlarged air chamber 16 is normally formed within the bumper 1. The chamber 16 is enclosed by a cover 18 that is fastened to the back by strips 21 so that a substantially air tight seal of the chamber 16 is realized.

In the back 5 of bumper 1, one or more exhaust apertures such as holes or slits 23, are located to permit air in the chamber 16 to exhaust when the front 3 and back 5 are moved together. Each aperture is normally covered by a flap 25 which can be of rigid material with a spring arm 27 that urges the flap 25 over the aperture 23 to close same. A further aperture or intake opening 29 is normally valved closed by a resilient closure 31 at the inner surface of back 5 to allow atmosphere air to enter chamber 16 when the bumper 1 is expanded under bias of springs 15.

Also, on back 5, coupling means including an upper bracket 35 and a lower bracket 37 can be attached as shown in FIG. 1. The upper bracket 35 is bifurcated at its outer end to clasp the upright boss of the steering assembly 39 journaled in the support 40 of a bicycle. The lower bracket 37 has twoparts each of which is provided with a clamp 38 at its outer end to grip respectively each member of the front wheel fork 42 above front axle 43 so that the bumper 1 is held in front of the bicycle's forward wheel 45 to more therewith.

In operation, it will be appreciated that upon striking an object, the bumper 1 will collapse against an air cushion within chamber 16. The collapse of the bumper 1 is occasioned first by the sides 7, bottom 9 and top 11 having their respective sections folded much like an accordian, but against the resistance of springs 15. However, the principal resistance to the collapse of the bumper 1 is afforded by the air cushion in chamber 16 which has only restricted openings 23 to pass through. Air exits from the chamber 16 through these openings while cover 18 restricts that air within the bumper from escaping through the interfittings of the side 7, bottom 9 and top 11 sections. Thus, any air leakage through the hinges 13 as well as cracks and spaces between the sections is held in check by cover 18 and the latter can be made of air impermeable material such as parachute nylon or similar flexible material.

Figure 4:
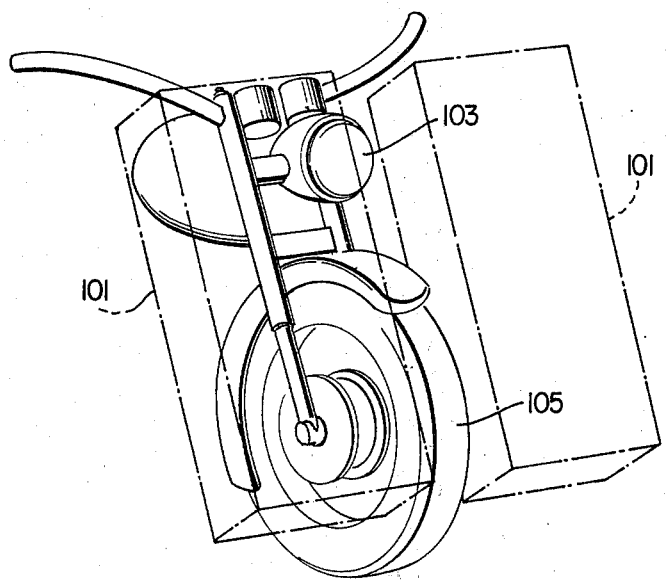
FIG. 4 is a front perspective of a modified bumper arrangement.

In FIG. 4 a pair of side-by-side bumpers 101 is shown mounted on a motorcycle so that a space is left between the bumpers 101 for the headlight 103 to project through. The bumpers 101 are essentially the same as bumper 1 in FIG. 1 except the shape of each bumper is conformed to that necessary to fit on the motorcycle, one to each side of the headlight 103. Brackets (not shown) are affixed to the cycle frame to support each bumper 101 in advance of the wheel 105.

Figure 2:
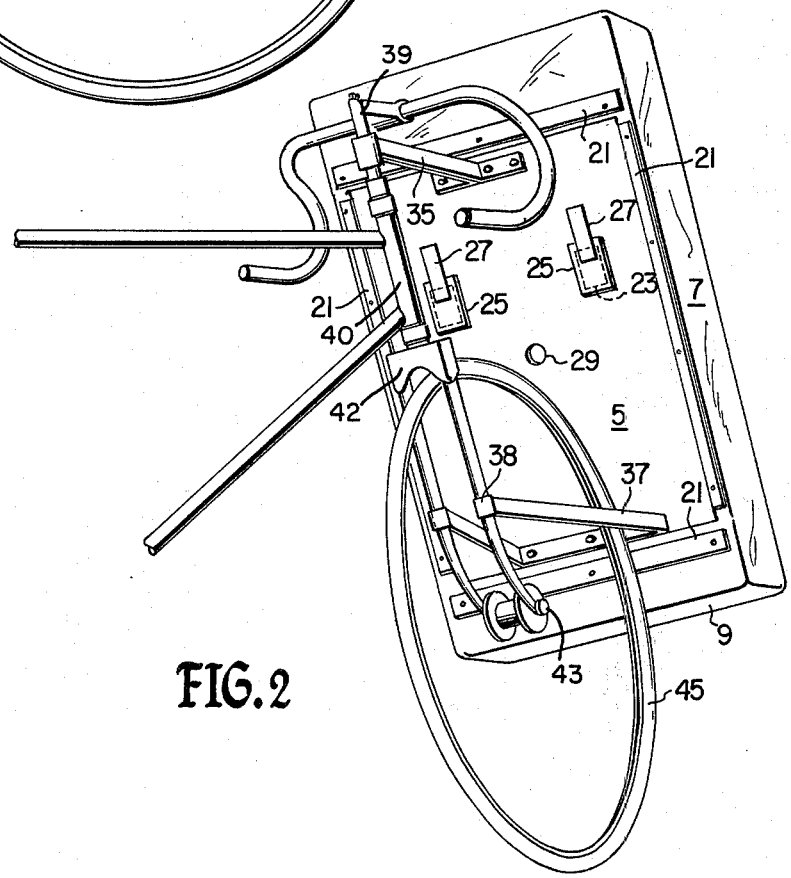
FIG. 2 is a perspective view of the FIG. 1 bumper.
Figure 5:
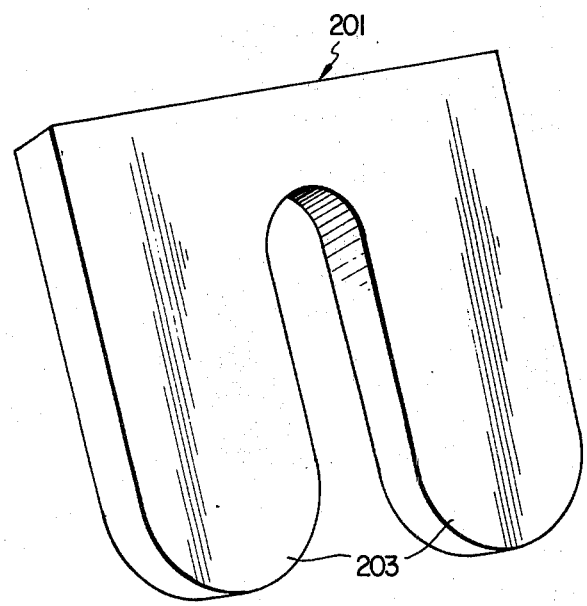
FIG. 5 is a front perspective of a further embodiment of the bumper.

In FIG. 5, an alternative shaped bumper 201 is shown made of two integral sections 203 so that a space for mounting as well as accommodating headlight 103, is formed between the bumper sections 201. The structural details of the bumper 201 are again the same as those shown in connection with FIGS. 1 – 3 in that a cover cloth again envelopes the hinged sides, top and bottom of bumper 201 with vents and spring means to allow controlled collapse of the bumper upon impact.

It will be appreciated that the front of the bumpers 1, 101 and 201 can each be fitted with a fanciful or ornamental forward part or the front 3 in FIG. 1, for instance, can itself be configured or designed as a shield or other appropriate object.

In the above description and in the attached drawings specific parts and structures are described and shown. However, it will be appreciated that other equivalent parts and structure are intended to be defined by the below claims.

What is claimed is:

1. A pneumatic bumper for a cycle comprising a front and a back connected to one another in normal spaced apart relationship to leave an inner air chamber, said front and back being interconnected by hinged collapsible side means and flexible cover means which encloses said chamber and seals same in a substantially airtight seal, means on said bumper urging said front and back apart and said bumper having exhaust means communicating with said chamber to allow the controlled escape of air when said front and back are urged towards one another upon impact and said side means collapsed, said bumper having coupling means for attachment to the forward end of a cycle in advance of the front wheel.

2. The bumper of claim 1 wherein said exhaust means includes at least one flap mounted on said back over an aperture in said back, said flap being biased to normally close said aperture.

3. The bumper of claim 1, wherein said side means comprise hinged sections which are foldable inwardly upon collapse.

4. The bumper of claim 3, wherein tension springs interconnect said sections to resist the hinging movements of said sections toward one another.

5. The bumper of claim 3, wherein said cover means is a flexible cover that is substantially impervious to air and said cover is attached to the front and back of said bumper to enclose said sides.

6. The bumper of claim 1, wherein at least one bracket of said coupling means is secured to said back, said bracket being detachably connected to a cycle frame, whereby said bumper extends forwardly over a front wheel of said cycle.

7. The bumper of claim 1, wherein a valved inlet is located in said back to admit air into said chamber when said back and front are spread apart to enlarge said chamber.

* * * * *